Jan. 4, 1927.

L. C. STURBELLE

MECHANICAL CONVERTER

Filed Jan. 26, 1925

1,613,543

Inventor
L. C. Sturbelle

Patented Jan. 4, 1927.

1,613,543

UNITED STATES PATENT OFFICE.

LUCIEN CHARLES STURBELLE, OF BRUSSELS, BELGIUM.

MECHANICAL CONVERTER.

Application filed January 26, 1925, Serial No. 4,866, and in Belgium January 30, 1924.

My invention relates to improvements in mechanical converters adapted to convert a constant driving couple, having a constant speed into a variable couple which increase gradually with the reduction of speed. It is based, as other devices of this kind upon the rotation under the action of the driving shaft, of centrifugal masses giving rise to reactions resulting in the rotation of the driven shaft.

One object of my invention is to secure a device of this kind of a simple and strong construction. Another object is to avoid the use of sinuous grooved cams for the guiding of the centrifugal masses.

With these objects in view my invention essentially consists in the special arrangement and combinations of parts as hereinafter fully described and pointed out in the appended claims.

Referring to the annexed drawing which shows as an example the simplest embodiment of my invention:

Figure 1:
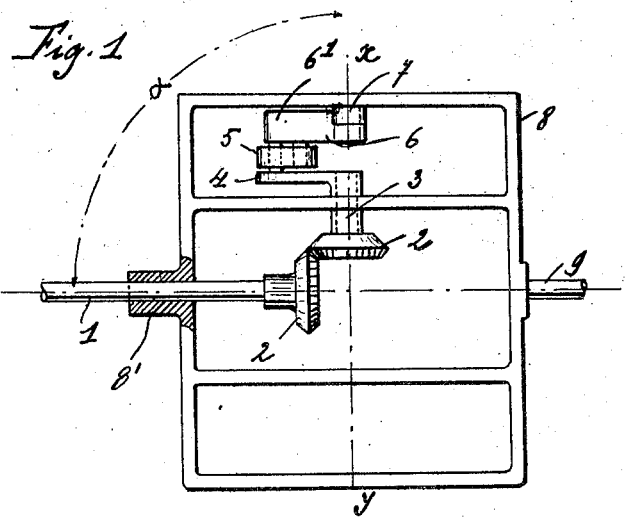
Fig. 1 is a top view of the device, showing only one of the centrifugal masses which are rotated by the driving shaft.
Figure 2:
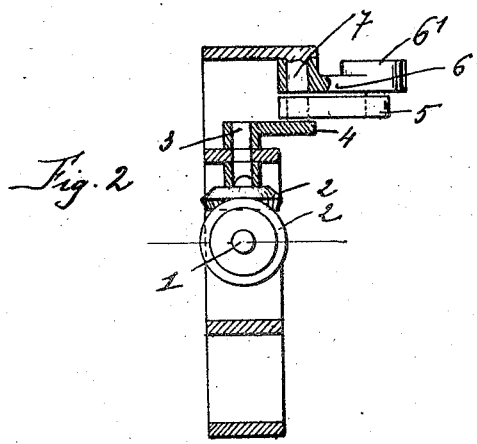
Fig. 2 is a section taken on line $x$—$y$ in Fig. 1.

In these figures 1 is a driving shaft rotating through two beveled wheels 2, a shaft 3 upon which a crank 4 is keyed. The said crank carries with it, in its rotation with the shaft 3, a crank 6 to which it is connected by a pivoted link 5. The crank 6 carries at its end a mass 6' and rotates on a trunnion 7 which is mounted in a frame 8 which is adapted to rotate around the driving shaft 1. In the example shown, the frame 8 forms a bearing 8' for the driving shaft 1 and is further bodily connected to the driven shaft or resisting shaft 9 which is conveniently supported in ordinary bearings (not shown). As shown more particularly in figs. 2 and 3 the axis of the trunnion 7 is eccentrically supported in the frame 8 relativley to the center of the shaft 3.

In its rotating movement around the trunnion 7, the crank 6, carrying the mass 6', describes a circle at a variable angular speed. As a result, the trunnion 7 is subjected to reactions, which in a complete rotation of the crank 6, secure a resulting force which is directed along a line corresponding substantially to the line passing through the centers of the axis of rotation 3 and 7 and, in any case, making a constant angle with this line.

The said reactions are acting at a distance from the center of the driving shaft 1 and consequently result in a couple having a tendency to cause the frame 8 to turn around the axis of the driving shaft 1, thus carrying with it the driven shaft 9.

If the trunnion 7 is conveniently located, it may be obtained:

1. A couple acting in the same direction as the driving shaft,
2. A couple acting in a reversed direction relatively to the driving shaft,
3. A couple which will be null.

As a consequence, according to the position which is given to the trunnion 7, one may obtain either the rotation of the shaft 9 in the same direction as the shaft 1 or a reversed rotation or the immobility of the shaft 9. In fact the resultant of the reactions which are produced by the rotation of the mass 6 around the trunnion 7, acts at the end of a lever arm corresponding to the radius of the circle which is described by the orthogonal projection of the mass 6' upon the frame 8 in the plane at right angles to the direction of the shaft 1. If the shaft 1 is rotated at a constant speed and if the trunnion 7 is located above the plane containing the shafts 1 and 3, in the direction of the movement, the shaft 9 will be rotated in the direction of the said movement. But by the fact, the speed of rotation of the shaft 3 will be decreased as well as the reaction due to the rotation of the mass 6' around the trunnion 7; but, on the other hand, the said reactions are increasd by the reactions due to the rotation around the shaft 1. If these latter reactions are sufficient to overcome the resistance of the shaft 9, the whole system will be rotated at the same speed and the transmission which will be realized will be equivalent to that known as direct gear in the ordinary transmitting gear systems.

Figure 3:
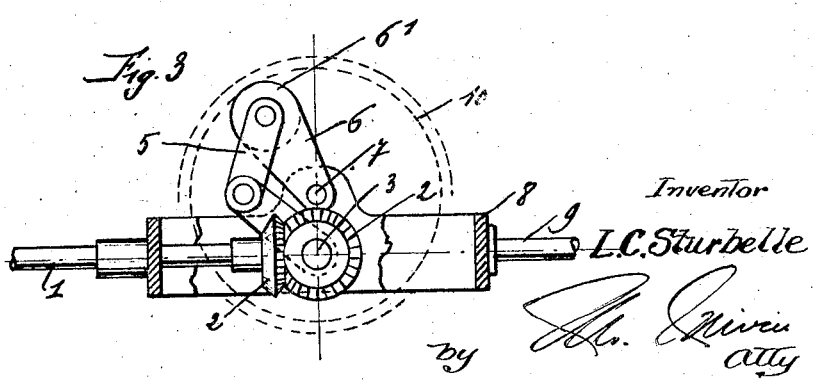
Fig. 3 is a partial section with vertical projection through the axis of rotation.

The mass 6' must not necessarily be rotated around the trunnion 7 it could also be mounted freely at the end of the crank 6 and receive the shape of a roller rolling in a guide excentrically mounted on the frame 8 as it is shown in dotted lines at 10 in Fig. 3.

In practice instead of using a single mass 6', a multiplicity of masses and of shafts 3, may be used, the said masses being acted upon by the bevel-wheels 2 which are rotated by the driving shaft 1.

In the example shown the angle α between the shafts 1 and 3 is supposed to be of 90°; this angle however may receive any value whatever. The reactions which cause the rotation of the frame 8 being reversible, it is obvious that the shaft 9 could be used also as driving shaft and the shaft 1 as driven shaft without modifying the operation of the device.

What I claim is:

1. In a device of the kind described, a driving shaft, a frame adapted to rotate about the shaft, a second shaft mounted in the frame at an angle to the driving shaft and operatively connected with the latter, and means intermediate the second shaft and frame including a mass to be rotated from a center beyond the plane of the driving shaft and operating in a plane at right angles to the axis of the second shaft, and means to communicate the resultant of the reactions of the rotation of said mass to said frame.

2. In a device of the kind described, a driving shaft, a frame adapted to rotate about the shaft, a second shaft mounted in the frame at an angle to the driving shaft and operatively connected with the latter, and means intermediate the second shaft and frame including a mass to be rotated from a center beyond the plane of the driving shaft and operating in a plane at right angles to the axis of the second shaft, and means to communicate the resultant of the reaction of the rotation of said mass to said frame, and a driving shaft operated in the movement of said frame.

3. In a device of the kind described, a driving shaft, a frame adapted to rotate around the said shaft, a second shaft mounted in the said frame, the said shaft forming an angle with the driving shaft, means whereby the said second shaft, is rotated by the driving shaft, a crank mounted on the said second shaft, a second crank mounted in the frame eccentrically to the second shaft driven by the driving shaft, a mass on the said second crank, a pivoted link connecting both cranks and a driven shaft connected to the frame whereby the reactions due to the rotation of the mass cause the frame to be rotated around the driving shaft.

In testimony whereof I have signed my name to this specification.

LUCIEN CHARLES STURBELLE.